Patented Dec. 22, 1942

2,306,109

UNITED STATES PATENT OFFICE 2,306,109

MANUFACTURE OF PIGMENTS

Robert H. Long, Parma, Ohio, assignor to The Harshaw Chemical Company, Elyria, Ohio, a corporation of Ohio No Drawing. Application June 28, 1940,
Serial No. 342,921

5 Claims. (Cl. 106—301)

This invention relates to the preparation of selenium and sulfur pigments, more particularly selenium red pigments, and has for its object to provide a process for the manufacture of such pigments of superior brilliance and strength.

By selenium and sulfur pigments I mean pigments such as cadmium sulfoselenides, cadmium sulfide, cadmopones (CdS·BaSO$_4$ or CdSSe$_x$·BaSO$_4$)

zinc lithopones and the like, whether pure or containing diluents or fillers. By selenium red pigments I mean cadmium sulfoselenide pigments of the so-called C. P. type as well as those containing added or coprecipitated fillers or extenders such as cadmium-selenium lithopones and the like.

Prior to my invention the art has developed along the line of preventing the presence of free sulfur or free selenium in these pigments by careful proportioning of the constituents of the pigment batch and tying up the sulfur and selenium in chemical combination before calcination. These procedures are not entirely successful in the attainment of their objective and sacrifice definite advantages otherwise obtainable in the calcination of these pigments.

I have now discovered that superior pigments as respects brilliance and strength can be produced if materials capable of yielding cadmium or zinc selenides, sulfides or sulfo-selenides, either pure or admixed with added or co-precipitated diluents, are calcined in an atmosphere of selenium in the case of selenide pigments or sulfur in the case of sulfide pigments or selenium or sulfur and selenium in the case of sulfo-selenide pigments, all in substantial absence of oxygen, and then the free selenium or free sulfur are extracted by the use of an alkaline solvent inert to the pigments. I am aware that pigments of this class can tolerate a small quantity of free selenium or sulfur or both, but close control of the quantity of free selenium or sulfur is desirable if color and strength are to be reproduced from batch to batch. Less close control is necessary when the extracting step herein described is employed.

Suitable solvents are alkali metal, barium, strontium and ammonium monosulfides, polysulfides, monoselenides and hydrosulfides, and alkali metal and ammonium hydroxides, normal carbonates and sulfites. Other alkaline solvents inert to the pigments may be used for extracting the free selenium or sulfur. Many of these solvents are relatively less desirable than others on account of cost. The solvents which I find most suitable are alkali metal and ammonium monosulfides and of these I prefer sodium monosulfide.

A wide variation in the relative amounts of extracting agent and water are possible, for example, from a ¼% solution of Na$_2$S to a saturated solution thereof at the boiling point. I prefer a 4% to 8% solution as a practical range, strong enough for good results but not strong enough to render the process unduly expensive. Usually 5 to 10 pounds of extracting agent per 100 pounds of pigment will be found suitable. The quantity of extracting agent is, of course, more properly related to the amount of selenium or sulfur to be extracted. I prefer to use a minimum of ¼ pound of Na$_2$S for each pound of free selenium in the pigment. This quantity would approximate the theoretical minimum assuming that Na$_2$S dissolves selenium as Na$_2$SSe$_4$. Practically, a small amount of selenium might remain, but very marked improvement would result in a case where the pigment contained any considerable quantity of free selenium. I prefer not to use more than 12 pounds of Na$_2$S per pound of selenium in the pigment. A greater quantity would, no doubt, be effective but hardly necessary in any case. In the case of sulfur, about ½ pound of Na$_2$S per pound of sulfur in the pigment is a practical minimum, while hardly more than 20 pounds should be found necessary. The extraction may be carried out at any temperature between the freezing point and the boiling point of the solution, but temperatures between 20° C. and 80° C. are preferred.

Potassium sulfides may be substituted for sodium sulfides in molecularly equivalent quantities and with similar results. Ammonium sulfide should be employed in larger than molecularly equivalent quantities. Apparently the concentrations of ammonium sulfide and other alkaline solvents most desirable are those required to produce pH values equivalent to those produced by quantities of Na$_2$S within the above indicated range. However, it cannot be said that all the various alkaline solvents have the same solvent power. Some are weaker than others, possibly because of a different dissolving mechanism. It is my belief, for example, that NaOH dissolves selenium by forming first Na$_2$Se which then takes up more selenium by forming the polyselenide.

Sodium mono-sulfide appears to be the most desirable extracting agent or solvent on account of its high effectiveness and low cost. The alkali metal and ammonium mono-sulfides constitute a sub-group of extracting agents of outstanding value for my purpose.

Example

Approximately 120 parts by weight of a pigment batch containing ingredients suitable for the production of a cadmium sulfo-selenide pigment were calcined in a selenium vapor atmosphere at 650° C. for ½ hour and immediately quenched in water. The calcined material contained about 1½ parts by weight of free selenium. This material was then ball milled with 150 parts by weight of water and 10 parts by weight of sodium mono-sulfide. The temperature was approximately 70° F. and the time of ball milling 30 minutes. The content of the ball mill was filtered and washed with water and found to contain substantially no free selenium and to be of greatly improved brilliance and strength.

Having thus described my invention, what I claim is:

1. A process for the production of a selenium red pigment comprising calcining the pigment batch in an atmosphere of selenium vapor substantially free from oxygen and then extracting free selenium from the resulting pigment by the use of an aqueous solution of a substance of the class consisting of alkali metal, barium, strontium, and ammonium monosulfides, polysulfides, monoselenides, and hydrosulfides, and alkali metal and ammonium hydroxides, normal carbonates and sulfites.

2. A process for production of a selenium red pigment comprising preparing a suitable pigment batch for the production of such pigment, calcining said batch in an atmosphere of selenium vapor substantially free from oxygen whereby there is produced a selenium red pigment containing free selenium derived from the calcination atmosphere and subjecting said pigment to attrition in an aqueous selenium solvent inert to the pigment.

3. A process for production of a selenium red pigment comprising preparing a suitable pigment batch for the production of such pigment, calcining said batch in an atmosphere of selenium vapor substantially free from oxygen whereby there is produced a selenium red pigment containing free selenium in proportion in the order of 1¼% of the pigment batch and then removing such free selenium from the pigment by extraction with an aqueous solvent for selenium which solvent is inert to the pigment.

4. A process according to claim 1 further characterized in that during the extraction the pigment is subjected to attrition.

5. A process according to claim 1 further characterized in that the quantity of free selenium in the pigment before extraction is approximately such as results from calcination in an atmosphere of selenium vapor.

ROBERT H. LONG.